Feb. 6, 1951          L. A. RODERT          2,540,547
AIR CONDITIONED GARMENT
Filed March 24, 1947
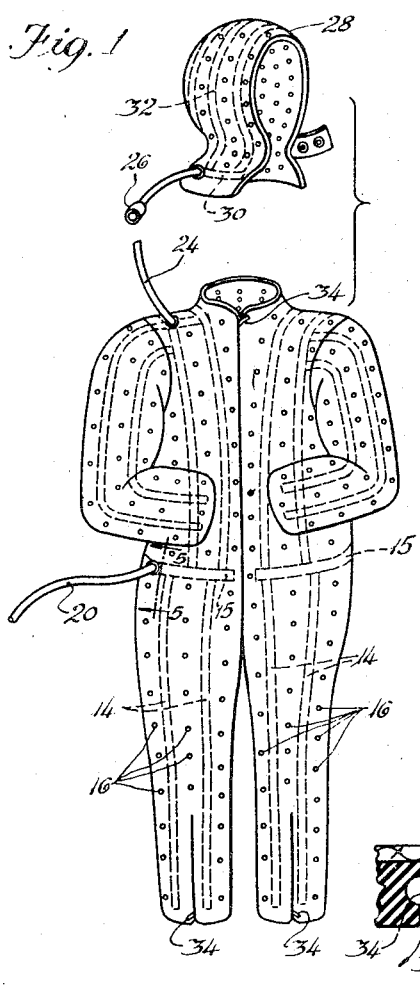
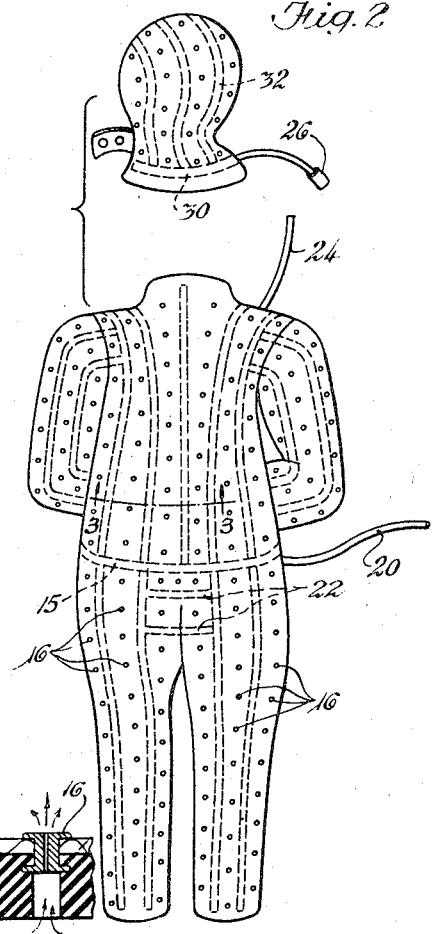
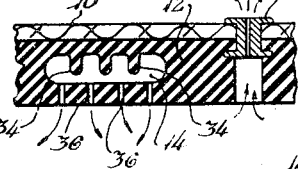
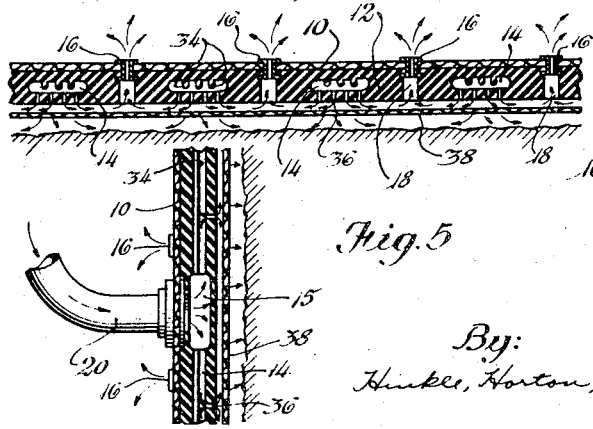
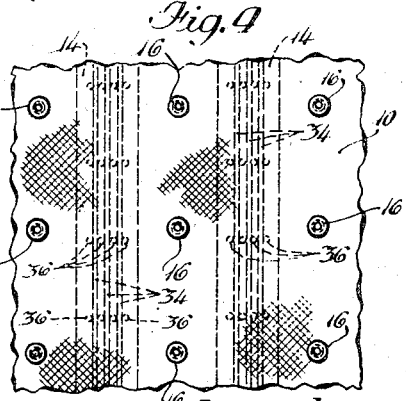
Inventor: Lewis A. Rodert Patented Feb. 6, 1951

2,540,547

UNITED STATES PATENT OFFICE 2,540,547

AIR-CONDITIONED GARMENT

Lewis A. Rodert, Cleveland, Ohio, assignor to Stewart-Warner Corporation, Chicago, Ill., a corporation of Virginia Application March 24, 1947, Serial No. 736,894

5 Claims. (Cl. 2—81)

1

The present invention relates to protective garments and more particularly to a protective garment which air conditions the wearer.

The garment of the present invention is particularly suitable for protecting and maintaining the comfort of a person who is required to be in a high temperature environment. As an example, recent developments in aircraft have increased the speeds thereof until the problem of aerodynamic heating of the airplane and occupants has become serious. In warm weather and at the high speeds readily attained by certain aircraft, cockpit temperatures of the order of 120 to 130 degrees F. are common and temperatures may be expected to go still higher as speeds are further increased.

Several proposals have been made for the solution of this problem. Usually they comprise the use of refrigerating equipment of the air cycle type which generally is arranged to be energized by an independent power plant, by the compressed air from an exhaust turbosupercharger, or which is obtained from the compressor of an aircraft combustion turbine, the latter being a frequent expedient suggested for jet propelled aircraft. In any event, all proposals with which I am familiar make it necessary to lower the temperature of all of the air within the cockpit or cabin as well as certain portions of the structure and equipment located within the cockpit. Considerable cooling is required to accomplish this in an effective manner and such equipment becomes expensive not only in first cost but also from the standpoint of the space and weight penalty it imposes upon the aircraft and the power it consumes. The garment of the present invention may be worn by a crew member of such an aircraft and through the use of this garment the cooling effect produced by any suitable refrigerating equipment is used with much greater efficiency and therefore the size and capacity of the refrigerating equipment may be quite small.

From the above it should not be presumed that the garment of the present invention is intended only for the use of occupants of high speed aircraft, this example being given merely as typical of one situation imposing a difficult problem because of the environment in which the person is required to work. Another example of conditions under which a garment of the present invention is particularly suitable is that which arises in certain industrial manufacturing processes where an operator is required to work under high temperature conditions and where it is substantially impossible to condition all of the air around the

2 operator inasmuch as the space may not be easily enclosable. The performance of certain duties in foundries is an example.

It also will be apparent later that the garment of the present invention is suitable for use under cold conditions where it is necessary to prevent the rapid loss of heat from the worker to the surrounding environment. Further, the garment has an additional utility under conditions where the operator is subjected to dust or a corrosive or poisonous atmosphere, particularly when these conditions are combined with high or low temperature conditions.

In view of the above, it is an object of the present invention to provide a garment which protects an operator against the surrounding atmosphere and in in which the wearer may be cooled or heated and ventilated by a constantly changing layer of fresh air.

Another object of the present invention is to provide a novel garment for the use of aircraft crews and the like which makes extremely efficient use of cooled air in promoting the comfort of a wearer.

Still another object of the present invention is to provide a novel arrangement for cooling the crews of high speed aircraft which accomplishes its objective without imposing an unnecessary weight or space penalty upon the aircraft and in which the power required for its effective operation is extremely low.

Still another object is to provide an improved protective garment which may be worn continuously for long periods in an extremely uncomfortable environment without discomfort to the wearer.

Yet another object is to provide a novel garment for removing heat and moisture from the body of a wearer in a regulated manner so as to promote the wearer's comfort while at the same time protecting the wearer against the surrounding atmosphere.

A further object is to accomplish the above at reasonable cost.

Other objects and advantages will become apparent from the following description of a preferred embodiment of my invention which is illustrated in the accompanying drawings.

In the drawings, in which similar characters of reference refer to similar parts throughout the several views:

Fig. 1 is a front view of a protective garment embodying the present invention;

Fig. 2 is a back view thereof;

Fig. 3 is a horizontal sectional view through a portion of the garment and may be considered as taken in the direction of the arrows along the line 3—3 of Fig. 2;

Fig. 4 is a fractional elevational view showing a portion of the garment illustrated in Figs. 1 and 2 but drawn to larger scale;

Fig. 5 is a sectional view which may be considered as taken in the direction of the arrows along the line 5—5 of Fig. 1 showing a detail of the construction; and Fig. 6 may be considered as a portion of Fig. 3 drawn to larger scale so as better to disclose details of the construction.

In general my invention provides a garment which substantially completely encloses a person and protects him against an unfavorable environmental atmosphere. It is so constructed and arranged that air at the desired temperature can be piped to the garment under a pressure slightly above atmospheric and this air will flow through passages within the garment so as to reduce or raise the garment temperature to the desired level. The air finally exhausts from the passages against the person's body surface over which it flows for a short distance before being exhausted to the atmosphere through openings specially provided for the purpose. Thus the temperature of the interior surface of the garment may be as desired and in addition the body of the person enclosed within the garment receives adequate ventilation so as to keep down the humidity level.

Under extremely cold conditions the air piped to the garment will of course be warm while if the environmental temperatures are high the air will be cooled to the desired level. In either event it is desirable that the air be somewhat dehydrated so as to increase its ability to take up moisture from the body surface. Under conditions where a garment of this type is required because of a toxic atmosphere it may not be necessary either to heat or cool the air, a suit under such conditions being provided merely for the purpose of protecting the wearer against the noxious atmosphere while at the same time providing adequate ventilation.

As shown in Fig. 1, the suit or garment is comprised of two elements, that is, a helmet and a body covering portion. The outer covering 10 for the suit may be constructed much in the manner of any flying suit excepting that I prefer to use for this purpose a "Glastex" cloth impregnated with a noninflammable gas-proof plastic. Such fabrics are available and in general comprise a cloth woven from the fine glass fibers impregnated with a thermosetting plastic material of any suitable type, the function of the plastic material being primarily to render the fabric substantially gastight and to prevent breaking off of the glass fibers. If desired, the outer surface of the garment may be covered with aluminum foil or aluminum bronze if the wearer is likely to come in contact with a hot environment where the high temperature is due largely to radiation. This type of environment may be found in certain foundry and other metallurgical operations, such as where steel is poured to form ingots and the like.

A second layer 12 is disposed immediately beneath the outer covering material 10 and may be composed of sponge rubber, foam latex, glass wool or similar materials which in general are pliable and serve the function of providing a considerable degree of thermal insulation. The material 12 is formed to provide a plurality of spaced, generally parallel flattened ducts 14 which intercommunicate at one or more points by way of manifolding passages 15. In general, the spacing between the ducts 14 depends upon the degree of cooling or heating required over different portions of the body. In other words, the greater the cooling or heating required the closer the spacing of the ducts. A row of spaced hollow eyelets 16 is disposed between adjacent rows of ducts 14. These eyelets extend through the outer wall 10 of the garment and through a portion of the material 12 so as to have their inner ends in communication with passages 18 extending through to the inner surface of the layer 12. In other words, these eyelets 16 together with the passages 18 form a multiplicity of small ducts interconnecting the inner and outer surfaces of the garment.

As shown in Fig. 5 a tube 20 is provided through which air at the proper temperature and humidity is supplied to the garment. This tube is connected by any suitable fitting to a manifold 15 which is shown as extending in a generally horizontal direction around the garment at approximately the waist of the wearer. This manifold tube 15 is formed within the layer 12 as illustrated in Fig. 5. The manifold 15 in turn communicates with the individual passages 14 which extend in a generally vertical direction so as to be relatively closely spaced over the entire surface of the garment including the arm and leg portions. Where desired the individnual passages 14 may be cross connected with each other as shown at 22 in Fig. 2.

As shown in Figs. 1 and 2 the main garment portion may be provided with an outlet tube 24 at the shoulder or any other convenient location which is adapted to be connected to a fitting 26 attached to a helmet 28 intended to form a portion of the garment under particularly adverse conditions. The helmet 28 may be formed in a manner similar to the main portion of the garment excepting that it is adapted to conform to the head of the wearer, it being equipped with a manifold 30 and vertically extending passages 32 similar to the manifold and passages 15 and 14, respectively.

If certain particularly pliable materials are used for the inner layer 12 of the garment it may be advisable to form ribs 34 within the ducts 14 and 15 to prevent the ducts from being crushed flat by the weight of the occupant. Whether these ribs are required or not depends upon the shape and size of the ducts, upon the material of which the inner layer is formed, and upon the portion of the garment within which the ducts are located.

In order to provide easy access to the main portion of the garment it may be split down the front and provided with a slide fastener 34 or other suitable means for forming a comparatively airtight closure.

Whenever the garment is in use and air of the proper temperature and humidity is supplied through the tube 20, it will flow through the manifold 15 and passages 14 so as to raise or lower the temperature of the suit as desired and eventually will escape through a plurality of small openings 36 which connect the passages 14 with the interior surface of the layer 12. The air after being tempered therefore will escape against the under garments 38 of the wearer so as to provide adequate ventilation and to take up moisture and then will pass transversely for a short distance to one of the passages 18 where it communicates with the inner end of one of the hollow eyelets 16 and thus passes to the atmosphere through the outer layer 10. When such a suit is worn it is apparent that comparatively lightweight and inexpensive equipment will supply sufficient tempered air for the purpose of insuring the comfort of the occupant under even extremely adverse conditions and that the suit need not be as heavy as otherwise might be necessary, particularly if very cold conditions are encountered.

Having described my invention, what I claim as new and useful and desire to secure by Letters Patent of the United States is:

1. A protective garment comprising an outer substantially gas impervious pliable layer formed as an article of clothing which is adapted substantially completely to enclose a wearer, an inner gas impervious layer fixed to said outer layer and formed of a material having good thermal insulating properties, said inner layer being formed to provide a plurality of air ducts closed adjacent opposite ends, means forming a plurality of spaced openings extending from said ducts through the inner side of said garment, means forming a plurality of spaced passages extending from the interior to the exterior of said garment, and means adapted to form a connection between a source of air under pressure and said ducts.

2. As an article of manufacture, a garment of gas impervious material adapted substantially completely to enclose a wearer, said garment having intercommunicating gas passages throughout the major portion of its area closed at opposite ends thereof to form a closed network, means for connecting a source of tempered air under pressure to said gas passages, the material of said garment having openings for the passage of air from said passages through the inner surface of said garment and other openings through said garment to provide for passage of air from the inner to the outer side thereof so that tempered air will flow through said passages and thence to the body surface of the wearer and subsequently to the atmosphere outside the garment.

3. A protective covering comprising an outer protective layer and an inner thermal insulating layer of gas-impervious material affixed thereto formed to enclose the body or portions of the body to be protected, a gas receiving network in said covering comprising a plurality of spaced elongated ducts disposed in substantially parallel spaced relation and passageways interconnecting said ducts, means to admit a tempered gas to said network, means to establish a flow of gas from said ducts to the space on the inner side of said covering, along the said inner side and from said latter region to the exterior of said covering including a plurality of openings establishing communication between said ducts and the space on the inner side of said covering, and means defining a plurality of apertures spaced laterally from said openings and establishing communication between the spaces on the opposite sides of said covering.

4. A protective covering comprising a body of gas impervious material formed to fit the body or portions of the body to be protected, a plurality of elongated interconnected gas passageways disposed in substantially parallel spaced relation in said material throughout the major portion of its area and formed to provide a closed network in said material, said material having a plurality of openings extending from said gas passageways through the inner side of said covering so that gas admitted to said passageways will flow through said opening and be discharged into the space surrounded by the protective covering and said material of said covering also having a plurality of openings in the space between adjacent passageways extending through the material to provide outlets for the discharge of gas from the space surrounded by the covering to the exterior of the covering.

5. A protective covering comprising a thermal insulating layer of gas impervious material formed to enclose the body or portions of the body to be protected, a closed gas receiving network in said covering comprising a plurality of spaced elongated ducts in said inner layer of generally rectangular shape in cross section disposed in substantially parallel spaced relation and passageways interconnecting said ducts, means to admit a tempered gas to said network, said material having a plurality of openings for the passage of gas from said ducts to the space on the inner side of said covering and a series of openings for the passage of gas from the space on the inner side of said covering to the space exterior to said covering, and a plurality of longitudinally extending ribs on one of the longer sides of said ducts adapted to engage the other side to provide support for preventing collapse of said ducts under the pressure to which they are subjected in normal use.

LEWIS A. RODERT.

REFERENCES CITED

The following references are of record in the file of this patent:

UNITED STATES PATENTS

| Number | Name | Date |
| --- | --- | --- |
| 174,286 | Ostberg | Feb. 29, 1876 |
| 2,093,834 | Gaugler | Sept. 21, 1937 |
| 2,255,751 | Bancel | Sept. 16, 1941 |
| 2,413,386 | Schulz | Dec. 31, 1946 |